United States Patent
Sawayama et al.

(10) Patent No.: US 8,481,206 B2
(45) Date of Patent: Jul. 9, 2013

(54) ELECTROLYTIC SOLUTION FOR NONAQUEOUS ELECTROLYTE SECONDARY BATTERY AND NONAQUEOUS ELECTROLYTE SECONDARY BATTERY USING THE ELECTROLYTIC SOLUTION

(75) Inventors: Takumi Sawayama, Chiba (JP); Masaaki Naito, Chiba (JP); Tsuneaki Tamachi, Chiba (JP); Kensuke Tahara, Chiba (JP); Shunji Watanabe, Chiba (JP)

(73) Assignee: Seiko Instruments Inc., Chiba-Shi, Chiba (JP)

( * ) Notice: Subject to any disclaimer, the term of this patent is extended or adjusted under 35 U.S.C. 154(b) by 341 days.

(21) Appl. No.: 12/875,691

(22) Filed: Sep. 3, 2010

(65) Prior Publication Data
US 2011/0059370 A1 Mar. 10, 2011

(30) Foreign Application Priority Data
Sep. 7, 2009 (JP) .................................. 2009-205767

(51) Int. Cl.
*H01M 6/14* (2006.01)

(52) U.S. Cl.
USPC ........... 429/200; 429/341; 429/326; 252/62.2

(58) Field of Classification Search
USPC .......................... 429/326, 341, 200; 252/62.2
See application file for complete search history.

(56) References Cited

FOREIGN PATENT DOCUMENTS

| JP | 11-026016 A | 1/1999 |
|----|-------------|--------|
| JP | 2009-252681 | * 10/2009 |

* cited by examiner

*Primary Examiner* — Laura Weiner
(74) *Attorney, Agent, or Firm* — Brinks Hofer Gilson & Lione

(57) ABSTRACT

Provided are an electrolytic solution for a nonaqueous electrolyte secondary battery and a nonaqueous electrolyte secondary battery each of which not only has heat resistance enough to resist reflow soldering but also can maintain the discharge capacity of the battery even in a low-temperature environment. The nonaqueous electrolyte secondary battery is provided with an electrolytic solution 50 including a solute and a solvent containing a polyethylene glycol dialkyl ether and an ethylene glycol dialkyl ether, a positive electrode 12, a negative electrode 26, and a separator 30 formed of glass fibers and placed between the positive electrode 12 and the negative electrode 26.

15 Claims, 2 Drawing Sheets

ELECTROLYTIC SOLUTION FOR NONAQUEOUS ELECTROLYTE SECONDARY BATTERY AND NONAQUEOUS ELECTROLYTE SECONDARY BATTERY USING THE ELECTROLYTIC SOLUTION

RELATED APPLICATIONS

This application claims priority under 35 U.S.C. §119 to Japanese Patent Application No. 2009-205767 filed on Sep. 7, 2009, the entire content of which is hereby incorporated by reference.

BACKGROUND OF THE INVENTION

1. Field of the Invention

The present invention relates to an electrolytic solution for a nonaqueous electrolyte secondary battery and a nonaqueous electrolyte secondary battery using the electrolytic solution.

2. Description of the Related Art

Nonaqueous electrolyte secondary batteries have been attracting attention as power sources for electronic instruments because the batteries each have a high energy density and a light weight. In particular, button type nonaqueous electrolyte secondary batteries have been widely utilized in portable electronic instruments such as portable telephones because of their small sizes.

In association with reductions in sizes of the electronic instruments and the like, the nonaqueous electrolyte secondary batteries have been implemented on the surfaces of substrates in recent years, and reflow soldering has been a mainstream method for the implementation.

Since the reflow soldering involves heating each of the nonaqueous electrolyte secondary batteries at about 250 to 260° C., such inconvenience as described below arises. That is, an electrolytic solution decomposes to cause a reduction in discharge capacity of each of the batteries, or the electrolytic solution leaks owing to bumping.

An electrolytic solution for a lithium secondary battery using an organic ether compound as a solvent has been conventionally proposed for enduring such reflow soldering at high temperatures (for example, Japanese Patent Application Laid-open No. Hei 11-26016).

By the way, the portable electronic instruments are each requested to have a sufficient discharge capacity in a wide range of temperature environments because the instruments are used outdoors as well as indoors.

However, a mere nonaqueous electrolyte secondary battery using an organic ether compound as a solvent and having heat resistance to endure the reflow soldering as described in Japanese Patent Application Laid-open No. Hei 11-26016 involves the following problem. That is, the voltage of the battery reduces in a low-temperature environment of 0° C. or less, and hence its discharge capacity is impaired.

SUMMARY OF THE INVENTION

In view of the foregoing, an object of the present invention is to provide an electrolytic solution for a nonaqueous electrolyte secondary battery and a nonaqueous electrolyte secondary battery each of which not only has heat resistance enough to resist reflow soldering but also can maintain the discharge capacity of the battery even in a low-temperature environment.

An electrolytic solution for a nonaqueous electrolyte secondary battery of the present invention includes a solute, and a solvent containing a polyethylene glycol dialkyl ether and an ethylene glycol dialkyl ether.

It is preferred that a volume ratio represented by "polyethylene glycol dialkyl ether/ethylene glycol dialkyl ether" be 50/50 to 20/80 and further, it is preferred that the electrolytic solution for a nonaqueous electrolyte secondary battery include ethylene glycol monoethyl ether. Further, it is preferred that the solute have lithium ion conductivity and it is more preferred that the solute contain lithium perfluoromethyl sulfonylimide.

A nonaqueous electrolyte secondary battery of the present invention is provided with a positive electrode, a negative electrode, a separator formed of glass fibers and placed between the positive electrode and the negative electrode, and the electrolytic solution of the present invention.

According to the present invention, the electrolytic solution for a nonaqueous electrolyte secondary battery and the nonaqueous electrolyte secondary battery each not only have heat resistance enough to resist reflow soldering but also can maintain the discharge capacity of the battery even in a low-temperature environment.

DETAILED DESCRIPTION OF THE PREFERRED EMBODIMENTS

The present invention is hereinafter described with reference to FIG. 1.

Figure 1:
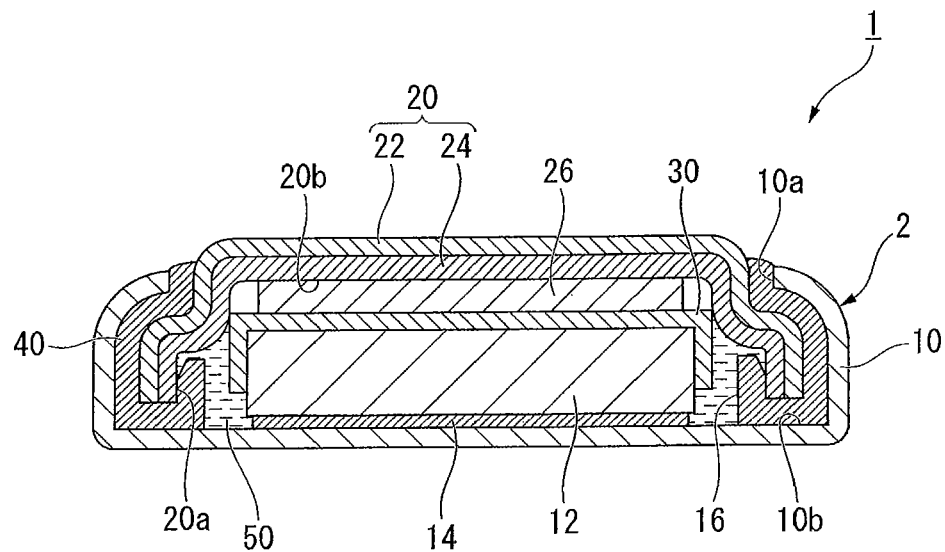
FIG. 1 is a sectional view of a nonaqueous electrolyte secondary battery according to an embodiment of the present invention.

In FIG. 1, a container 2 is formed of a closed-end tubular positive electrode can 10, a lidded tubular negative electrode can 20 that clogs an opening portion 10a of the positive electrode can 10, and a gasket 40 provided along the inner peripheral surface of the positive electrode can 10. An opening portion 20a of the negative electrode can 20 is inserted into the positive electrode can 10 so that the circumference of the opening portion 10a of the positive electrode can 10 may be caulked inside the opening portion 20a. As a result, the container is sealed. The negative electrode can 20 is obtained by sticking stainless steel and hard aluminum through rolling, and is of a two-layer structure formed of a stainless layer 22 on the outer side and a hard aluminum layer 24 on the inner side.

A nonaqueous electrolyte secondary battery 1 is such that, in the container 2, a positive electrode 12 and a negative electrode 26 are placed so as to be opposite to each other through a separator 30, and an electrolytic solution 50 is charged into an enclosed space 16. In addition, the positive electrode 12, the negative electrode 26, and the separator 30 are impregnated with the electrolytic solution 50 charged into the container 2.

The positive electrode 12 is joined to an internal bottom surface 10b of the positive electrode can 10 with a positive electrode collector 14 formed of a conductive resin adhesive using carbon as a conductive filler, and the separator 30 is mounted on the positive electrode 12. The negative electrode 26 is mounted on the separator 30, and the negative electrode 26 is crimped onto an internal canopy 20b of the negative electrode can 20, that is, the hard aluminum layer 24.

The electrolytic solution 50 is prepared by dissolving a solute in a solvent, and the solvent contains a polyethylene glycol dialkyl ether (which may hereinafter be referred to as "component (A)") and an ethylene glycol dialkyl ether (which may hereinafter be referred to as "component (B)").

The total amount of the components (A) and (B) in the solvent, which is not particularly limited, is preferably 50 mass % or more, more preferably 70 mass % or more, still more preferably 90 mass % or more, or particularly preferably 100 mass %. This is because an effect of the present invention can be exerted more significantly as the total amount of the components (A) and (B) in the solvent increases.

In addition, the solvent has a viscosity (20° C.) of preferably 2.0 mPa·s or less, or more preferably 1.5 mPa·s or less. Such viscosity can prevent a reduction in discharge capacity of the battery in a low-temperature environment. The viscosity of the solvent can be adjusted by the kinds of the components (A) and (B), and the ratio at which each of the components is blended.

It should be noted that the viscosity is a value measured with a Brookfield viscometer in conformity with JIS K7117-1.

Each alkyl group of the component (A) may be linear, or may have a branched chain. In addition, the number of carbon atoms of each alkyl group of the component (A), which is not particularly limited, is preferably 1 to 6, more preferably 1 or 2, or still more preferably 1. As long as the number of carbon atoms of each alkyl group of the component (A) falls within the above-mentioned range, when the component is combined with the component (B), the viscosity of the electrolytic solution 50 can be reduced and the discharge capacity can be maintained even in a low-temperature environment without the impairment of the heat resistance of the electrolytic solution 50 enduring reflow soldering. It should be noted that the two alkyl groups of the component (A) may be identical to or different from each other in number of carbon atoms.

Examples of the component (A) include: diethylene glycol dialkyl ethers such as diethylene glycol dimethyl ether, diethylene glycol diethyl ether, and diethylene glycol methyl ethyl ether; triethylene glycol dialkyl ethers such as triethylene glycol dimethyl ether and triethylene glycol diethyl ether; and tetraethylene glycol dialkyl ethers such as tetraethylene glycol dimethyl ether and tetraethylene glycol diethyl ether. Of those, tetraethylene glycol dialkyl ether is preferred, tetraethylene glycol dimethyl ether and tetraethylene glycol diethyl ether are more preferred, and tetraethylene glycol dimethyl ether is still more preferred. The use of tetraethylene glycol dimethyl ether can further improve heat resistance and discharge capacity in a low-temperature environment.

One kind of the above-mentioned component (A) may be used alone, or two or more kinds of the component (A) may be used in an appropriate combination.

The component (A) has a boiling point (BP) of 200° C. or more, preferably 250° C. or more, or more preferably 260° C. or more. When the boiling point is 200° C. or more, the heat resistance enduring reflow soldering is additionally improved. It should be noted that the boiling point is a value measured in conformity with JIS K5601-2.

Although the viscosity of the component (A) is not particularly limited, for example, its viscosity (20° C.) is preferably 4.0 to 5.0 mPa·s. For example, tetraethylene glycol diethyl ether has a viscosity (20° C.) of 4.1 mPa·s. With such viscosity, when the component is combined with the component (B), the viscosity of the electrolytic solution 50 can be reduced, and the discharge capacity can be maintained and improved even in a low-temperature environment.

Each alkyl group of the component (B) may be linear, or may have a branched chain. In addition, the number of carbon atoms of each alkyl group of the component (B), which is not particularly limited, is preferably 1 to 6, more preferably 1 or 2, or still more preferably 2. As long as the number of carbon atoms of each alkyl group of the component (B) falls within the above-mentioned range, the viscosity of the electrolytic solution 50 can be reduced and the discharge capacity can be maintained even in a low-temperature environment without the impairment of the heat resistance of the electrolytic solution 50 enduring reflow soldering. It should be noted that the two alkyl groups of the component (B) may be identical to or different from each other in number of carbon atoms.

Examples of the component (B) include ethylene glycol dimethyl ether, ethylene glycol methyl ethyl ether, ethylene glycol diethyl ether, and ethylene glycol dipropyl ether. Of those, ethylene glycol dimethyl ether, ethylene glycol methyl ethyl ether, and ethylene glycol diethyl ether are preferred, and ethylene glycol diethyl ether is more preferred. The use of ethylene glycol diethyl ether can further improve heat resistance and discharge capacity in a low-temperature environment.

One kind of the above-mentioned component (B) may be used alone, or two or more kinds of the component (B) may be used in an appropriate combination.

The component (B) has a boiling point of preferably 80° C. or more, or more preferably 120° C. or more. As long as the boiling point of the component (B) falls within the above-mentioned range, when the component is combined with the component (A), the heat resistance enduring reflow soldering is additionally improved.

Although the viscosity of the component (B) is not particularly limited, for example, its viscosity (20° C.) is preferably 1.0 mPa·s or less, or more preferably 0.7 mPa·s or less. With such viscosity, when the component is combined with the component (A), the viscosity of the electrolytic solution 50 can be reduced, and the discharge capacity can be maintained and improved even in a low-temperature environment.

A volume ratio "(A)/(B)" of the component (A) to the component (B) in the solvent, which is not particularly limited, is preferably 50/50 to 20/80, or more preferably 40/60 to 20/80. With such blending ratio, the viscosity of the electrolytic solution 50 can be reduced and the discharge capacity can be additionally improved even in a low-temperature environment without the impairment of the heat resistance of the electrolytic solution 50 enduring reflow soldering.

Any other organic solvent as well as the components (A) and (B) can be blended into the solvent to such an extent that the effect of the present invention is not impaired. Examples of the other organic solvent include: carbonic acid ester compounds such as propylene carbonate, butylene carbonate, and dimethyl carbonate; and carboxylic acid ester compounds such as methyl acetate, ethyl acetate, methyl propionate, ethyl propionate, and γ-butyrolactone. One kind of those solvents may be used alone, or two or more kinds thereof may be used in an appropriate combination.

A known substance to be used as a solute in an electrolytic solution for a nonaqueous electrolyte secondary battery can be used as the solute. Examples of the known substance include: lithium salts such as lithium salts of organic acids including $LiCH_3SO_3$, $LiCF_3SO_3$, $LiN(CF_3SO_2)_2$ (lithium perfluoromethyl sulfonylimide), $LiN(C_2F_5SO_2)_2$, $LiC(CF_3SO_2)_3$, $LiN(CF_3SO_3)_2$, and the like and lithium salts of inorganic acids including $LiClO_4$, $LiAsF_6$, $LiPF_6$, $LiBF_4$, $LiB(C_6H_5)_4$, LiCl, LiBr, and the like; potassium salts such as KPF$_6$; sodium salts such as NaPF$_6$, NaBF$_4$, and Na$_2$CF$_3$SO$_3$; and the like. Of those, the lithium salts as compounds each having lithium ion conductivity are preferred, and lithium perfluoromethyl sulfonylimide is more preferred. This is because the effect of the present invention significantly appears in a high-voltage lithium battery using a lithium salt. One kind of those solutes may be used alone, or two or more kinds thereof may be used in an appropriate combination.

The content of the solute in the electrolytic solution 50 can be determined in consideration of, for example, the kind of the solute. For example, when a lithium salt is used, the content is preferably determined within a range of 0.1 to 3 mol/L. When the concentration of the lithium salt is excessively high or excessively low, a reduction in electric conductivity of the electrolytic solution occurs, and the reduction may adversely affect the characteristics of the battery.

Ethylene glycol monoethyl ether (which may hereinafter be referred to as "component (C)") can be further blended into the electrolytic solution 50. Blending the component (C) can improve the wettability of the separator 30, and hence can prevent the precipitation of the solute from the electrolytic solution with which the separator 30 is impregnated and the maldistribution of the electrolytic solution 50 even in a low-temperature environment. In addition, by virtue of an improvement in wettability of the separator 30, a liquid junction between the positive electrode 12 and the negative electrode 26 is maintained, and hence the discharge capacity of the nonaqueous electrolyte secondary battery 1 can be maintained even in a low-temperature environment.

The content of the component (C) in the electrolytic solution 50 is preferably 0.05 to 2 vol %, or more preferably 0.1 to 0.4 vol %. As long as the content falls within the above-mentioned range, the wettability of the separator 30 can be improved without the impairment of the heat resistance of the electrolytic solution 50.

The electrolytic solution 50 can be prepared, for example, by mixing the components (A) and (B) to prepare the solvent, adding an arbitrary amount of the solute and, as required, the component (C) to the solvent, and stirring the mixture to dissolve the solute.

Examples of the positive electrode 12 include a manganese oxide and a lithium-containing manganese oxide.

Examples of the negative electrode 26 include lithium foil, a lithium-aluminum alloy, and carbon with which lithium is brought into contact or which is electrochemically doped with lithium. Of those, the lithium foil is preferred.

The separator 30 is formed of glass fibers, and preferred examples of the separator include nonwoven fabrics made of glasses such as borosilicate glass, quartz glass, and lead glass. Of those, a nonwoven fabric made of borosilicate glass is more preferred. Since the nonwoven fabric made of borosilicate glass is excellent in mechanical strength and has a large ionic permeability, a reduction in internal resistance of the battery and an improvement in discharge capacity can be achieved.

A material to be used in the gasket 40 is a resin having a heat distortion temperature of 230° C. or more. Examples of the resin include polyphenyl sulfide, polyethylene terephthalate, polyamide, a liquid crystal polymer (LCP), a tetrafluoroethylene-perfluoroalkyl vinyl ether copolymer resin (PFA), a polyether ether ketone resin (PEEK), a polyether nitrile resin (PEN), a polyether ketone resin (PEK), a polyarylate resin, a polybutylene terephthalate resin, a polycyclohexane dimethylene terephathalate resin, a polyethersulfone resin, a polyaminobismaleimide resin, a polyetherimide resin, a fluorine resin, and the like. Further, there can be suitably used a material obtained by adding a glass fiber, a mica whisker, a ceramic fine powder, or the like to any of those materials in an amount of 30 mass % or less. The use of any such material can prevent the deformation of the gasket 40, and can prevent the volatilization or leakage of the electrolytic solution 50 in reflow soldering.

As described above, according to the present invention, when the solvent contains the component (A), the electrolytic solution obtains the heat resistance enduring reflow soldering. Further, when the solvent contains the component (B), an increase in viscosity of the electrolytic solution in a low-temperature environment is controlled, and an increase in internal resistance between the positive electrode and the negative electrode can be prevented. As a result, the nonaqueous electrolyte secondary battery secures smooth movement of an ionized solute (such as a lithium ion) to suppress a voltage drop (IR drop), and hence can suppress the reduction of its discharge capacity even in a low-temperature environment.

When the electrolytic solution contains the component (C), the wettability of the separator formed of glass fibers can be improved, and the discharge capacity of the nonaqueous electrolyte secondary battery can be maintained even in a low-temperature environment. In addition, in the nonaqueous electrolyte secondary battery, the liquid-holding performance of the separator for the electrolytic solution is improved, and a reduction in discharge capacity can be suppressed even after long-term storage.

(Evaluation Methods)

<Capacity Maintenance Ratio Under Low Temperature>

The discharge capacity of a reflow secondary battery of each example to be described later at 25° C. was measured, and the value was represented by V1. Next, the discharge capacity of the reflow secondary battery of each example at −20° C. was measured, and the value was represented by V2. A capacity maintenance ratio (%) was calculated from the following equation (1). The calculated value was defined as a capacity maintenance ratio under a low temperature.

$$\text{Capacity maintenance ratio (\%)} = V2 \div V1 \times 100 \tag{1}$$

<Capacity Maintenance Ratio after Storage>

The reflow secondary battery of each example was stored at 80° C. for 20 days. After that, its capacity maintenance ratio was calculated in the same manner as in the above-mentioned capacity maintenance ratio under a low temperature. The calculated value was defined as a capacity maintenance ratio after storage.

PRODUCTION EXAMPLES

Preparation of Electrolytic Solutions A to L

Electrolytic solutions A to L were each prepared in accordance with the composition shown in Table 1 by dissolving lithium perfluoromethyl sulfonylimide as a solute in a solvent so that a concentration might be 1 mol/L.

It should be noted that compounds represented by abbreviations for solvents in Table 1 are as described below.

TEG: tetraethylene glycol dimethyl ether

DEE: ethylene glycol diethyl ether

DME: ethylene glycol dimethyl ether

DIG: diethylene glycol dimethyl ether

EGEE: ethylene glycol monoethyl ether

TABLE 1

| Electrolytic solution | Solvent composition of electrolytic solution (volume ratio) | EGEE (vol %) |
|---|---|---|
| A | TEG/DEE = 50/50 | — |
| B | TEG/DME = 50/50 | — |
| C | TEG/DEE = 80/20 | — |
| D | TEG/DEE = 75/25 | — |
| E | TEG/DEE = 67/33 | — |
| F | TEG/DEE = 33/67 | — |
| G | TEG/DEE = 25/75 | — |
| H | TEG/DEE = 20/80 | — |
| I | TEG = 100 | — |
| J | DEE = 100 | — |
| K | TEG/DIG = 50/50 | — |
| L | TEG/DEE = 50/50 | 0.5 |

Examples 1 to 8 and Comparative Examples 1 to 3

A nonaqueous electrolyte secondary battery similar to the nonaqueous electrolyte secondary battery 1 illustrated in FIG. 1 was produced as described below.

First, 90 parts by mass of an LiMn-containing oxide, 7 parts by mass of graphite as a conductive agent, and 3 parts by mass of a polyacrylic resin as a binder were mixed. Thus, a positive electrode mixture was obtained. The positive electrode mixture was subjected to pressure molding at 2 ton/cm$^2$. Thus, a pellet-shaped positive electrode having a diameter of 2.2 mm was obtained. The pellet-shaped positive electrode was joined to the internal bottom surface of a positive electrode can made of stainless steel with a positive electrode collector formed of a conductive resin adhesive using carbon as a conductive filler. Thus, an integrated (unitized) positive electrode unit was obtained. The positive electrode unit was dried by heating in the air at 220° C. for 12 hours.

Next, a nonwoven fabric using fibers made of borosilicate glass as raw materials was dried, and was then punched into a disk shape having a diameter of 3 mm and a thickness of 200 μm to serve as a separator. Then, the separator was mounted on the positive electrode. Lithium foil punched into a disk shape having a diameter of 2 mm and a thickness of 0.22 mm was mounted on the separator to serve as a negative electrode.

Then, 5 μL of an electrolytic solution of each example shown in Table 2 were charged into the positive electrode can, and then the positive electrode can and a negative electrode can were fitted with each other. Thus, a nonaqueous electrolyte secondary battery was obtained. The resultant nonaqueous electrolyte secondary battery was subjected to a reflow treatment involving preheating at 160 to 200° C. for 10 minutes and heating at 260° C. for 10 seconds after the preheating. The nonaqueous electrolyte secondary battery subjected to the reflow treatment was left at rest at room temperature for 24 hours. Thus, a reflow secondary battery was obtained. The capacity maintenance ratio under a low temperature of the reflow secondary battery was determined, and the result was shown in Table 2. It should be noted that, with regard to the reflow secondary battery of Example 1, a capacity maintenance ratio after storage was determined and the result was shown in Table 3.

TABLE 2

| | Electrolytic solution | Capacity maintenance ratio under low temperature (%) | Leakage of electrolytic solution |
|---|---|---|---|
| Example 1 | A | 70.5 | Absent |
| Example 2 | B | 64.5 | Absent |
| Example 3 | C | 34.2 | Absent |
| Example 4 | D | 37.6 | Absent |
| Example 5 | E | 44.9 | Absent |
| Example 6 | F | 74.7 | Absent |
| Example 7 | G | 77.9 | Absent |
| Example 8 | H | 80.2 | Absent |
| Comparative Example 1 | I | 28.7 | Absent |
| Comparative Example 2 | J | 81.2 | Present |
| Comparative Example 3 | K | 59.2 | Absent |

As shown in Table 2, a capacity maintenance ratio under a low temperature exceeded 30% in each of Examples 1 to 8 in each of which the solvent of the electrolytic solution was a mixed solvent of the components (A) and (B). In addition, in each of Examples 1 to 8, neither the leakage of the electrolytic solution nor the breakdown of the nonaqueous electrolyte secondary battery occurred in the reflow treatment.

On the other hand, in Comparative Example 1 in which only TEG was used as a solvent, a capacity maintenance ratio under a low temperature was as low as 28.7%. In addition, in Comparative Example 2 in which only DEE was used as a solvent, a capacity maintenance ratio under a low temperature was 81.2%, but the leakage of the electrolytic solution or the breakdown of the nonaqueous electrolyte secondary battery occurred in the reflow treatment.

In addition, the capacity maintenance ratio under a low temperature in Example 1 in which a mixed solvent having a volume ratio "(A)/(B)" of 50/50 was used was higher than that in Comparative Example 3 in which a mixed solvent prepared by mixing the components (A) at a volume ratio of 50/50 was used.

The foregoing results showed that the nonaqueous electrolyte secondary battery of the present invention had heat resistance enough to resist reflow soldering and was able to prevent the reduction of its discharge capacity in a low-temperature environment.

Figure 2:
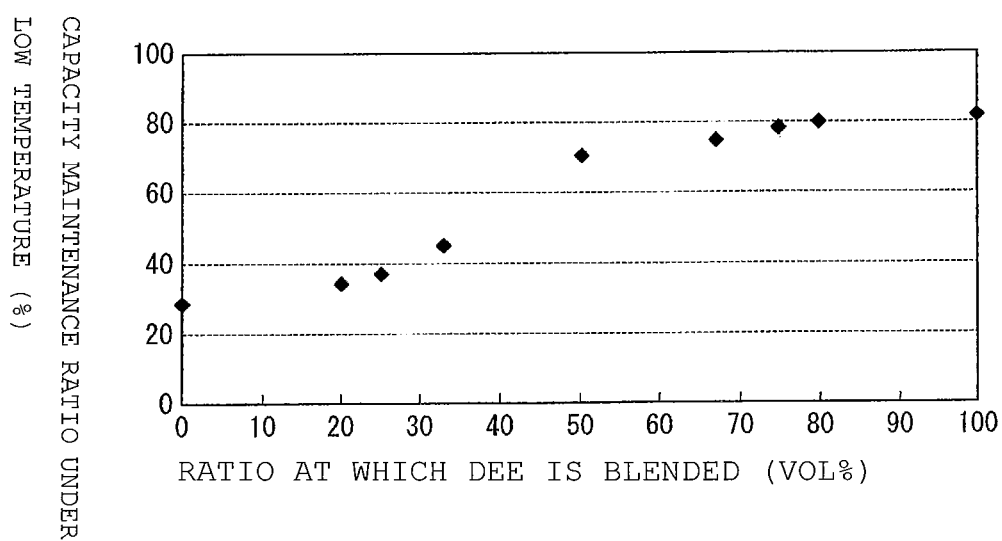
FIG. 2 is a graph showing capacity maintenance ratios under a low temperature in Examples 1 and 3 to 8, and Comparative Examples 1 and 2.

FIG. 2 is a graph obtained by plotting the capacity maintenance ratios under a low temperature in Examples 1 and 3 to 8, and Comparative Examples 1 and 2. The axis of abscissa indicates the ratio (vol %) at which DEE is blended into the solvent and the axis of ordinate indicates the capacity maintenance ratio under a low temperature.

As illustrated in FIG. 2, a significant increase in capacity maintenance ratio (a capacity maintenance ratio in excess of 70%) was observed in an example in which the ratio at which DEE was blended into the solvent was 50 vol % or more (see FIG. 2).

Example 9 and Reference Examples 1 to 4

Reflow secondary batteries were each obtained in the same manner as in Example 1 except that an electrolytic solution shown in Table 3 was used as the electrolytic solution, and a material shown in Table 3 was used in the separator. The capacity maintenance ratios after storage of the resultant reflow secondary batteries were determined, and the results were shown in Table 3.

TABLE 3

| | Electrolytic solution | Separator material | Capacity maintenance ratio after storage (%) |
|---|---|---|---|
| Example 1 | A | Borosilicate glass | 49.2 |
| Example 9 | L | Borosilicate glass | 61.1 |
| Reference Example 1 | A | Polyether ether ketone | 47.6 |
| Reference Example 2 | L | Polyether ether ketone | 44.9 |
| Reference Example 3 | A | Polyphenylene sulfide | 39.7 |
| Reference Example 4 | L | Polyphenylene sulfide | 40.2 |

Figure 3:
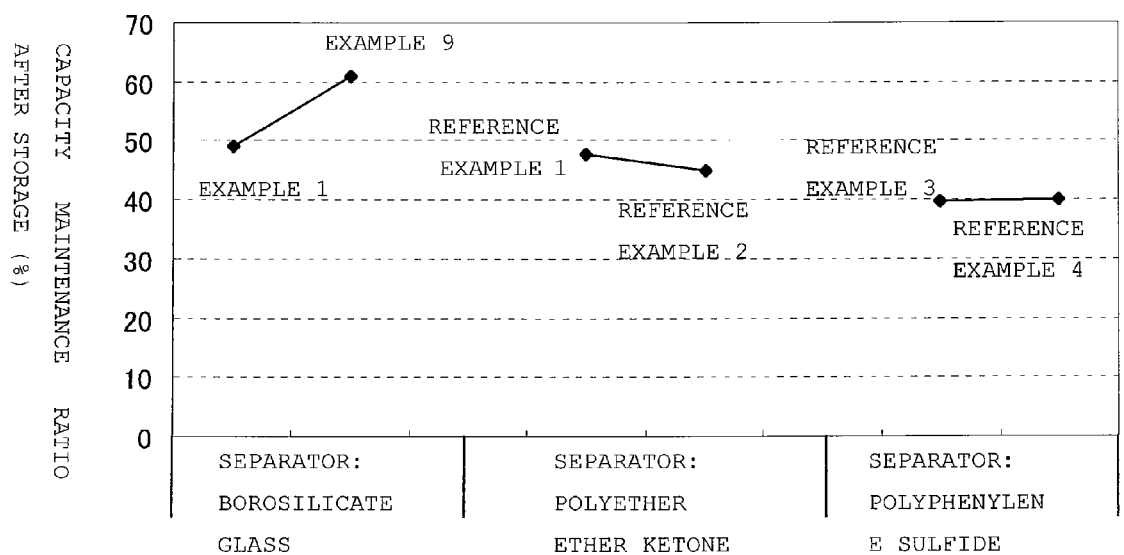
FIG. 3 is a graph showing capacity maintenance ratios after storage in Examples 1 and 9, and Reference Examples 1 to 4.

FIG. 3 is a graph illustrating the capacity maintenance ratios after storage in Examples 1 and 9, and Reference Examples 1 to 4. It should be noted that, in FIG. 3, the axis of ordinate indicates the capacity maintenance ratio after storage and the axis of abscissa is divided on a separator material basis.

As shown and illustrated in Table 3 and FIG. 3, the capacity maintenance ratio after storage in Example 9 in which borosilicate glass was used as a separator material and the electrolytic solution L to which EGEE was added was used increased by about 12 points as compared with that in Example 1 in which EGEE was not added.

On the other hand, in each of Reference Examples 1 to 4 in each of which polyether ether ketone or polyphenylene sulfide was used as a separator material, no significant increase in capacity maintenance ratio after storage was observed even when EGEE was added to the electrolytic solution.

The foregoing results showed that the use of an electrolytic solution to which EGEE was added was able to improve the capacity maintenance ratio after storage of a nonaqueous electrolyte secondary battery using a separator made of borosilicate glass.

What is claimed is:

1. An electrolytic solution for a nonaqueous electrolyte secondary battery, the electrolytic solution comprising: a solute; and a solvent containing (i) a tetraethylene glycol dialkyl ether and (ii) an ethylene glycol dialkyl ether, wherein a volume ratio of (i) to (ii) is 50/50 to 20/80.

2. An electrolytic solution for a nonaqueous electrolyte secondary battery according to claim 1, further comprising ethylene glycol monoethyl ether.

3. An electrolytic solution for a nonaqueous electrolyte secondary battery according to claim 2, wherein the solute has lithium ion conductivity.

4. An electrolytic solution for a nonaqueous electrolyte secondary battery according to claim 2, wherein the solute contains lithium perfluoromethyl sulfonylimide.

5. A nonaqueous electrolyte secondary battery, comprising: a positive electrode; a negative electrode; a separator formed of glass fibers and placed between the positive electrode and the negative electrode; and the electrolytic solution according to claim 2.

6. An electrolytic solution for a nonaqueous electrolyte secondary battery according to claim 1, wherein the solute has lithium ion conductivity.

7. An electrolytic solution for a nonaqueous electrolyte secondary battery according to claim 6, wherein the solute contains lithium perfluoromethyl sulfonylimide.

8. A nonaqueous electrolyte secondary battery, comprising: a positive electrode; a negative electrode; a separator formed of glass fibers and placed between the positive electrode and the negative electrode; and the electrolytic solution according to claim 6.

9. An electrolytic solution for a nonaqueous electrolyte secondary battery according to claim 1, wherein the solute contains lithium perfluoromethyl sulfonylimide.

10. A nonaqueous electrolyte secondary battery, comprising: a positive electrode; a negative electrode; a separator formed of glass fibers and placed between the positive electrode and the negative electrode; and the electrolytic solution according to claim 9.

11. A nonaqueous electrolyte secondary battery, comprising: a positive electrode; a negative electrode; a separator formed of glass fibers and placed between the positive electrode and the negative electrode; and the electrolytic solution according to claim 1.

12. An electrolytic solution for a nonaqueous electrolyte secondary battery according to claim 1 wherein the solvent contains (i) tetraethylene glycol diallyl ether and (ii) ethylene glycol dimethyl ether.

13. A nonaqueous electrolyte secondary battery, comprising: a positive electrode; a negative electrode; a separator formed of glass fibers and placed between the positive electrode and the negative electrode; and the electrolytic solution according to claim 12.

14. An electrolytic solution for a nonaqueous electrolyte secondary battery according to claim 1 wherein the solvent contains (i) tetraethylene glycol dimethyl ether and (ii) ethylene glycol diethyl ether.

15. A nonaqueous electrolyte secondary battery, comprising: a positive electrode; a negative electrode; a separator formed of glass fibers and placed between the positive electrode and the negative electrode; and the electrolytic solution according to claim 1.

* * * * *